G. W. WILMOT
DRIVE CHAIN.
APPLICATION FILED DEC. 26, 1912. RENEWED JUNE 15, 1914.
1,109,808.
Patented Sept. 8, 1914.
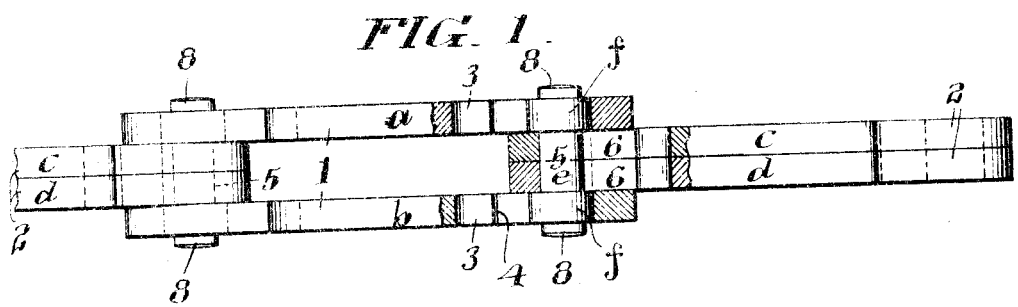
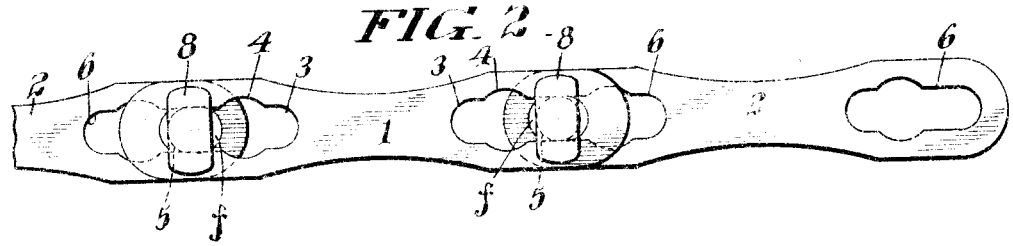
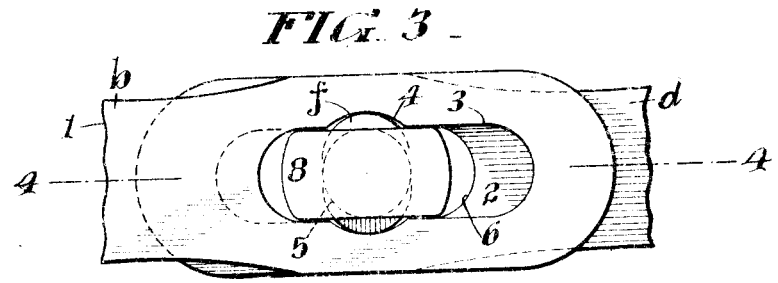
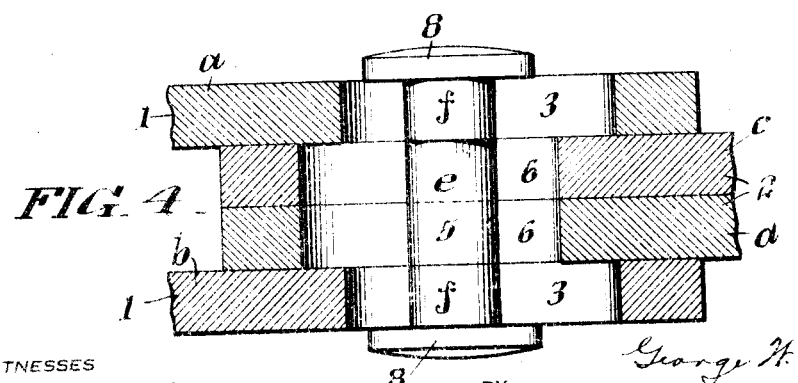
WITNESSES
Daniel Webster Jr.
Currie E. Kleinfelder
INVENTOR
George W. Wilmot
BY Cyrus N. Anderson
ATTORNEY

UNITED STATES PATENT OFFICE.

GEORGE W. WILMOT, OF HAZLETON, PENNSYLVANIA.

DRIVE-CHAIN.

1,109,808.     Specification of Letters Patent.     Patented Sept. 8, 1914.

Application filed December 26, 1912, Serial No. 738,654. Renewed June 15, 1914. Serial No. 845,293.

*To all whom it may concern:*

Be it known that I, GEORGE W. WILMOT, a citizen of the United States, and a resident of Hazleton, county of Luzerne, State of Pennsylvania, have invented certain new and useful Improvements in Drive-Chains, of which the following is a specification.

My invention relates to improvements in drive chains of the character in which the links are detachably connected together by means of removable devices such as pintles or pivots, and it comprehends the construction and arrangement of parts as hereinafter fully described and as illustrated in the accompanying drawings in which one form of a convenient embodiment of my invention is illustrated.

In the said drawings:—Figure 1 is a view partly in plan and partly in horizontal longitudinal section of a portion of chain embodying my invention; Fig. 2 is a side elevation of the same; Fig. 3 is a side elevation of the adjacent ends of two connected links in position to permit the removal of the connecting device therefrom; and Fig. 4 is a horizontal section on the line 4—4 of Fig. 3.

Having reference to the drawings,—1 designates a link consisting of two members $a$ and $b$ arranged in parallel spaced relation with respect to each other. The number of links 1 which enter into the construction of a chain varies with the length of the chain and they alternate with links 2 the latter being illustrated as consisting of two members $c$ and $d$; but it will be understood that each of the links 2 may consist of a single integral member if preferred. Each of the members $a$ and $b$ of the link 1 is provided with slots 3 the ends of which are rounded or circular as shown. Intermediate the ends of these slots enlargements 4 are provided for a purpose to be hereinafter explained. The portions of the said slots between the enlarged portions 4 and the outer ends thereof are preferably longer than the portions thereof upon the opposite sides of the enlarged portions 4.

5 designates a pintle the central portion $e$ of which is circular, said portion extending through and occupying slots 6 which are formed in the outer ends of the links 2. The said slots 6 have rounded ends and straight parallel sides. The pintles 5 are each also provided upon opposite sides of the circular portion $e$ with elliptical portions $f$ which occupy the slots 3 in the members $a$ and $b$ of the link 1. The thickness of these portions $f$ is substantially equal to the width of the narrower portions of the slots 3 upon opposite sides of the enlarged portions 4 and also substantially equal to the diameter of the central portion $e$ of the pintle. This fact is clearly evident from an inspection of the drawings. The length of the said portions $f$ in the direction of their major axes is substantially equal to the width of the enlarged portions 4 of the said slots 3. Each of the pintles 5 upon their opposite ends are provided with heads 8 of oblong shape, shown as being substantially rectangular in outline. When in use and when the chain is fully extended and under stress the pintles occupy positions indicated in Figs. 1 and 2 of the drawings in which positions the length of the heads 8 extend transversely of the length of the chain while the elliptical portions $f$ occupy positions with their major axes parallel with the length of the links in which they are supported, in which positions it is impossible for the said pintles to become accidentally removed to permit accidental disconnection of the links. This is due to the fact that the opposite ends of the oblong heads 8 extend beyond the opposite edges of the outer end portions of the slots 3. When it is desired to remove a pintle and thereby disconnect the adjacent ends of any two links, the said pintle is moved inwardly of the members $a$ and $b$ to the position indicated in Figs. 3 and 4 which corresponds to the position of the enlargements 4 in the slots 3 and in which position the said pintles may be turned so as to bring the major axes of the elliptical portions $f$ at right angles to the length of the chain at which time the heads 8 which are arranged at right angles to such axes extend in the direction of the length of the slots 3 and if the adjacent link 2 be maintained in alinement with the link 1 and the slots 6 register with the slots 3 the said pintle may be removed. The purpose of providing the extensions of the slot 3 inwardly from the enlarged portions 4 is to permit the elliptical portions $f$ of the pintles to pass beyond the said enlarged portions 4 into the said narrower inwardly extended portions of the said slots in case the said chain should become so slackened that there would be opportunity for such movement. In other words, if the pintles have an opportunity to move from the outer ends of the slots 3 inwardly beyond the enlarged portions 4 instead of having their movements terminated when they have reached such enlarged portions they are not nearly so apt to become accidentally removed or disengaged from the members *a* and *b* of the links 1.

I claim:

1. A chain comprising links consisting of two parallel spaced members having slots in their opposite ends the said slots each having an enlarged portion intermediate their ends and the portions thereof upon opposite sides of the said enlarged portions having substantially straight sides, links which alternate with the first named links and which have their ends interposed between the members of the latter and which have elongated slots in their opposite ends, pintles for connecting the ends of the alternating links, the said pintles respectively having elliptical portions at their opposite end portions for engagement with the slots in the parallel spaced members of the said first mentioned links, and the said pintles each having oblong heads at their opposite ends arranged at right angles to the major axes of the said elliptical portions, substantially as and for the purpose described.

2. A chain comprising links consisting of two parallel spaced members each of which is provided with slots at its opposite ends, the said slots having an enlarged portion intermediate their ends and the said slots terminating in rounded ends, links alternating with the first named links and having their opposite ends situated between the end portions of the members of the adjacent alternating links and also having elongated slots in their opposite ends, pintles extending through the slots of the overlapped ends of the alternating links, the said pintles respectively being provided with circular central portions for engagement with the slots of the second named links and having elliptical portions upon the opposite sides of the said enlarged central portions for engagement with the slots in the members of the first named links and the minor axes of the said elliptical portions of the said pintles being of a length substantially equal to the width of the narrower portions of the slots in the said members, and the major axes of the said elliptical portions being of a length substantially equal to the width of the enlarged portions of the said slots, and the said pintles being provided with elongated heads at their opposite ends extending at right angles to the major axes of the said elliptical portions, substantially as and for the purpose described.

3. A chain comprising links each of which consists of two parallel members spaced apart and having slots in their opposite ends, the said slots each having an enlarged circular portion intermediate their ends, links which alternate with the first named links and which have their ends interposed between the members of the latter and which are provided with longitudinal horizontal slots, the said slots terminating in rounded ends, pintles for connecting the ends of the alternating links, the said pintles having circular central portions with which the rounded ends of the slots in the second named links are engaged, and the said pintles respectively having oblong portions upon opposite sides of the central portions for engagement with the slots in the parallel spaced members of the first mentioned links, and the said pintles each having oblong heads at their opposite ends arranged at right angles to the length of the said oblong portions, substantially as and for the purpose described.

In testimony that I claim the foregoing as my invention, I have hereunto signed my name this 18 day of December, A. D. 1912.

GEORGE W. WILMOT.

In the presence of—
JOHN J. KELLEY,
DAISY TEMPLE.